United States Patent
Lansing et al.

(10) Patent No.: US 8,971,326 B2
(45) Date of Patent: *Mar. 3, 2015

(54) APPARATUS AND METHOD FOR HARDWARE PAYLOAD HEADER SUPPRESSION, EXPANSION, AND VERIFICATION

(75) Inventors: Shane P. Lansing, Mission Viejo, CA (US); Heratch Avakian, Glendale, CA (US)

(73) Assignee: Broadcom Corporation, Irvine, CA (US)

(*) Notice: Subject to any disclaimer, the term of this patent is extended or adjusted under 35 U.S.C. 154(b) by 880 days.

This patent is subject to a terminal disclaimer.

(21) Appl. No.: 12/939,508

(22) Filed: Nov. 4, 2010

(65) Prior Publication Data

US 2011/0103385 A1   May 5, 2011

Related U.S. Application Data

(63) Continuation of application No. 11/889,984, filed on Aug. 17, 2007, now Pat. No. 7,835,360, which is a continuation of application No. 10/218,582, filed on Aug. 15, 2002, now Pat. No. 7,599,369.

(60) Provisional application No. 60/324,911, filed on Sep. 27, 2001.

(51) Int. Cl.
*H04L 12/28* (2006.01)
*H04L 29/06* (2006.01)

(52) U.S. Cl.
CPC .............. *H04L 69/04* (2013.01); *H04L 69/22* (2013.01)
USPC ........................... 370/392; 370/419; 370/474

(58) Field of Classification Search
USPC ......................................... 370/392, 419, 474
See application file for complete search history.

(56) References Cited

U.S. PATENT DOCUMENTS

| | | | |
|---|---|---|---|
| 5,568,486 A * | 10/1996 | Huscroft et al. | ........... 370/395.2 |
| 5,619,501 A | 4/1997 | Tamer et al. | |
| 6,188,692 B1 | 2/2001 | Huscroft et al. | |
| 6,310,801 B1 | 10/2001 | Condemi et al. | |
| 6,438,123 B1 | 8/2002 | Chapman | |
| 6,671,881 B1 | 12/2003 | Tamer et al. | |
| 6,788,707 B1 | 9/2004 | Horton et al. | |
| 7,024,516 B2 | 4/2006 | Lu | |
| 7,327,726 B2 | 2/2008 | Kye | |
| 7,370,100 B1 | 5/2008 | Gunturu | |
| 7,599,369 B2 | 10/2009 | Lansing et al. | |
| 7,835,360 B2 * | 11/2010 | Lansing et al. | ................ 370/392 |
| 2002/0065907 A1 * | 5/2002 | Cloonan et al. | ................ 709/223 |
| 2008/0037545 A1 | 2/2008 | Lansing et al. | |

FOREIGN PATENT DOCUMENTS

WO    WO 0117314 A2    3/2001
WO    WO 0117314 A3    1/2002

OTHER PUBLICATIONS

"Data-Over-Cable Service Interface Specifications—Radio Frequency Interface Specification SP-RFIv1.1-I05-000714", Cable Television Laboratories, Inc., Jul. 14, 2000, pp. i-xviii, 1-6, 15-21,93-100, and 143-178.
European Search Report from EP Application No. 02256730.9, 3 pages, dated Apr. 14, 2004.

* cited by examiner

*Primary Examiner* — Hassan Phillips
*Assistant Examiner* — Mark A Mais
(74) *Attorney, Agent, or Firm* — Sterne, Kessler, Goldstein & Fox P.L.L.C.

(57) ABSTRACT

The present invention provides methods for performing payload header suppression (PHS), expansion, and verification in hardware. A PHS verify circuit reads a data packet until it reaches the location where the first byte must be compared to PHS rule verify bytes. Next, all the relevant bytes in the payload header are compared to the PHS vile verify bytes obtained from a payload header suppression rule mask. Upon completion of the compare, a flag is generated to a PHS suppress circuit indicating that verification has passed or failed. For payload headers passing the verification process, the payload header suppress circuit examines the payload header suppression mask to identify one or more bits in the payload header for which an associated byte string is to be suppressed. Next, the associated byte string for each of the identified bits are suppressed to generate a suppressed packet payload header. Finally, a payload header suppression index is added to the suppressed packet payload header. The data packet, including the suppressed packet header and suppression index are then transmitted. Once received, a payload header suppress circuit on the receiver end examines the payload header suppression index to determine if the payload header has been suppressed. For each suppressed payload header, each bit in the payload header is compared to a payload header suppression mask to determine if the bit has been suppressed. Next, for each suppressed bit, a byte string is retrieved from a payload header suppression rule and inserted into the suppressed payload header.

20 Claims, 8 Drawing Sheets

| Word Offset | 3 3 2 2 2 2 2 2 2 2 2 2 1 1 1 1 1 1 1 1 1 1 9 8 7 6 5 4 3 2 1 0 |
|---|---|
| 0 | Rule Length \| PHS Index \| Service Flow ID Index |
| 1 | V |
| 2 | PHS Mask |
| ... | |
| 7 | |
| 8 | |
| 9 | PHS Rule Verify Bytes (if V=1; number of bytes = rule length) |
| ... | |
| ... | |

APPARATUS AND METHOD FOR HARDWARE PAYLOAD HEADER SUPPRESSION, EXPANSION, AND VERIFICATION

CROSS-REFERENCE TO RELATED APPLICATIONS

This application is a continuation of U.S. patent application Ser. No. 11/889,984, filed Aug. 17, 2007, now U.S. Pat. No. 7,835,360, which is a continuation of U.S. patent application Ser. No. 10/218,582, filed Aug. 15, 2002, now U.S. Pat. No. 7,599,369, which claims the benefit of U.S. Provisional Patent Application No. 60/324,911, filed Sep. 27, 2001, each of which are incorporated herein by reference in their entireties.

BACKGROUND OF THE INVENTION

1. Field of the Invention

The present invention is generally related to communication systems. More particularly, the present invention is related to performing Payload Header Verification and Payload Header Suppression (PHS) and Expansion.

2. Related Art

The Data Over Cable System Interface Specification (DOCSIS) introduced the concept of Payload Header Suppression (PHS). Payload header suppression can be divided into a verification portion and a suppression portion. Before allowing suppression, the PHS verification portion compares bytes targeted for suppression against a set of bytes defined for a specific PHS rule. During the suppression portion, the transmitting device uses the PHS Rule to suppress a frequently recurring portion of the payload header of a packet, thereby reducing the amount of data transmitted on the cable. The receiving device restores the header data using a locally stored version of the same PHS rule. Heretofore, cable modems and cable modem termination systems have relied upon software to perform the functions of payload header verification and suppression. Reliance upon software, however, results in significant processing overhead. As a result of this processing overhead, the number of cable modems supportable by a single cable modem termination system is reduced.

Thus, what is needed is an apparatus and method for performing payload header verification, suppression and expansion in hardware such that the performance of the overall system is significantly improved.

BRIEF DESCRIPTION OF THE DRAWINGS/FIGURES

FIG. 6 is an illustration of an exemplary payload header suppression rule in accordance with the DOCSIS specification.

DETAILED DESCRIPTION OF THE INVENTION

Terminology

Payload Header Suppression (PHS) refers to the suppression of an initial byte string at the sender and restoration of the byte string at the receiver.

Payload Header Suppression Index (PHSI) refers to an 8-bit value which references the suppressed byte string.

Payload Header Suppression Rule (PHS Rule) refers to a set of Type-Length-Value requirements that apply to a specific PHSI.

Payload Header Suppression Field (PHSF) refers to a string of bytes representing the header portion of a Protocol Data Unit (PDU) in which one or more bytes will be suppressed (i.e., a snap-shot of the uncompressed PDU header inclusive of suppressed and unsuppressed bytes.)

Payload Header Suppression Mask (PHSM) refers to a bit mask which indicates which bytes in the PHSF to suppress, and which bytes to not suppress.

Payload Header Suppression Verify Flag (PHSV) refers to a flag which tells the sending device to verify all bytes which are not to be suppressed.

Exemplary Apparatus Embodiments

Figure 1:
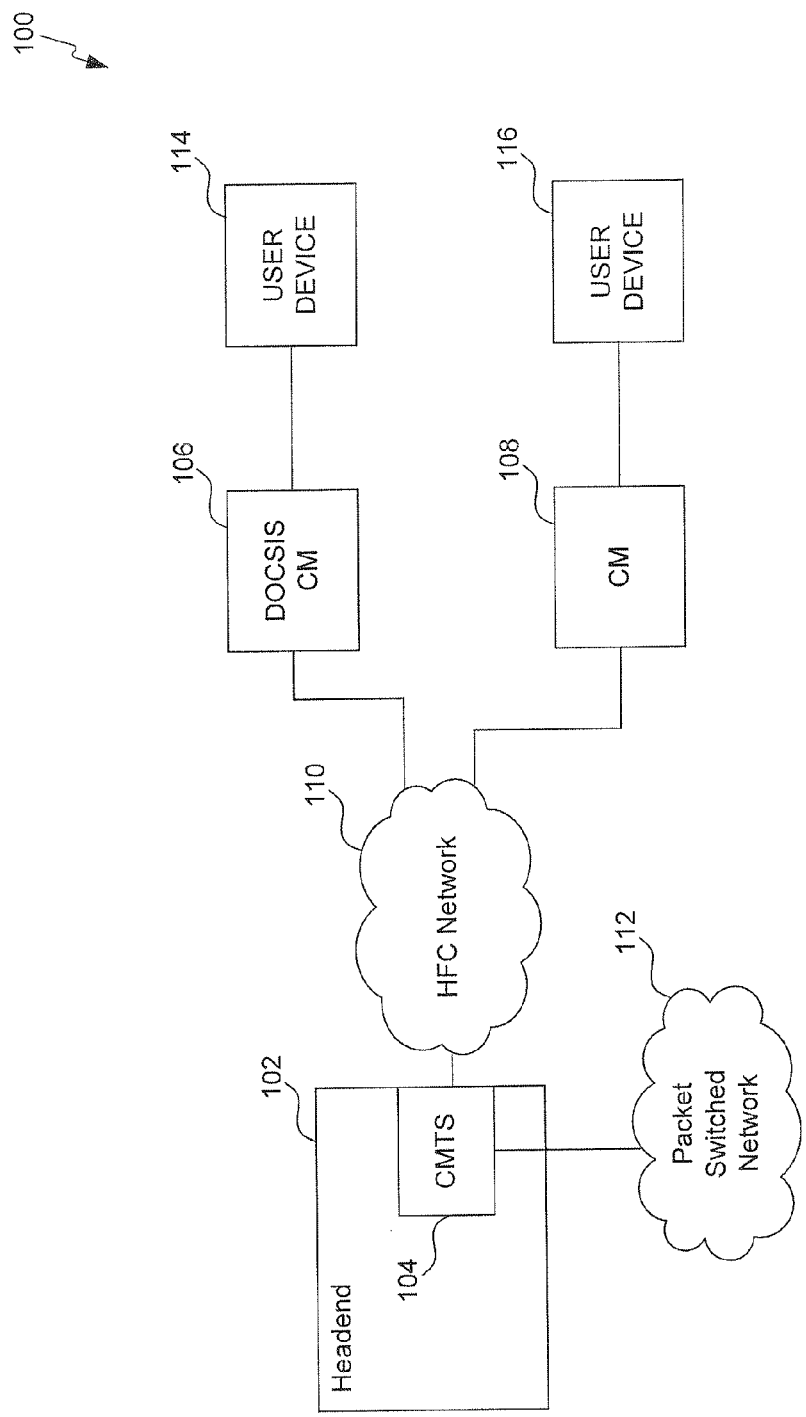
FIG. 1 is a high level block diagram of a cable modem system in accordance with embodiments of the present invention.

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems over a hybrid fiber-coaxial (HFC) cable network 110. In the example cable modem system 100, only two cable modems 106 and 108 are shown for clarity. In general, any number of cable modems may be included in the cable modem system of the present invention.

The cable headend 102 is comprised of at least one cable modem termination system (CMTS) 104. The CMTS 104 is the portion of the cable headend 102 that manages the upstream and downstream transfer of data between the cable headend 102 and the cable modems 106 and 108, which are located at the customer premises. The CMTS 104 broadcasts information downstream to the cable modems 106 and 108 as a continuous transmitted signal in accordance with a time division multiplexing (TDM) technique. Additionally, the CMTS 104 controls the upstream transmission of data from the cable modems 106 and 108 to itself by assigning to each cable modem 106 and 108 short grants of time within which to transfer data. In accordance with this time domain multiple access (TDMA) technique, each cable modem 106 and 108 may only send information upstream as short burst signals during a transmission opportunity allocated to it by the CMTS 104.

As shown in FIG. 1, the CMTS 102 further serves as an interface between the HFC network 110 and a packet-switched network 112, transferring IP packets received from the cable modems 106 and 108 to the packet-switched network 112 and transferring IP packets received from the packet-switched network 112 to the cable modems 106 and 108 when appropriate. In embodiments, the packet-switched network 112 comprises the Internet.

In addition to the CMTS 104, the cable headend 102 may also include one or more Internet routers to facilitate the connection between the CMTS 104 and the packet-switched network 112, as well as one or more servers for performing necessary network management tasks.

The HFC network 110 provides a point-to-multipoint topology for the high-speed, reliable, and secure transport of data between the cable headend 102 and the cable modems 106 and 108 at the customer premises. As will be appreciated by persons skilled in the relevant art(s), the HFC network 110 may comprise coaxial cable, fiberoptic cable, or a combination of coaxial cable and fiberoptic cable linked via one or more fiber nodes.

Each of the cable modems 106 and 108 operates as an interface between the HFC network 110 and at least one attached user device. In particular, the cable modems 106 and 108 perform the functions necessary to convert downstream signals received over the HFC network 110 into IP data packets for receipt by an attached user device. Additionally, the cable modems 106 and 108 perform the functions necessary to convert IP data packets received from the attached user device into upstream burst signals suitable for transfer over the HFC network 110. In the example cable modem system 100, each cable modem 106 and 108 is shown supporting only a single user device for clarity. In general, each cable modem 106 and 108 is capable of supporting a plurality of user devices for communication over the cable modem system 100. User devices may include personal computers, data terminal equipment, telephony devices, broadband media players, network-controlled appliances, or any other device capable of transmitting or receiving data over a packet-switched network.

In the example cable modem system 100, cable modem 106 represents a conventional DOCSIS-compliant cable modem. In other words, cable modem 106 transmits data packets to the CMTS 104 in formats that adhere to the protocols set forth in the DOCSIS specification. Cable modem 108 is likewise capable of transmitting data packets to the CMTS 104 in standard DOCSIS formats.

Furthermore, in the example cable modem system 100, the CMTS 104 operates to receive and process data packets transmitted to it in accordance with the protocols set forth in the DOCSIS specification.

Figure 2:
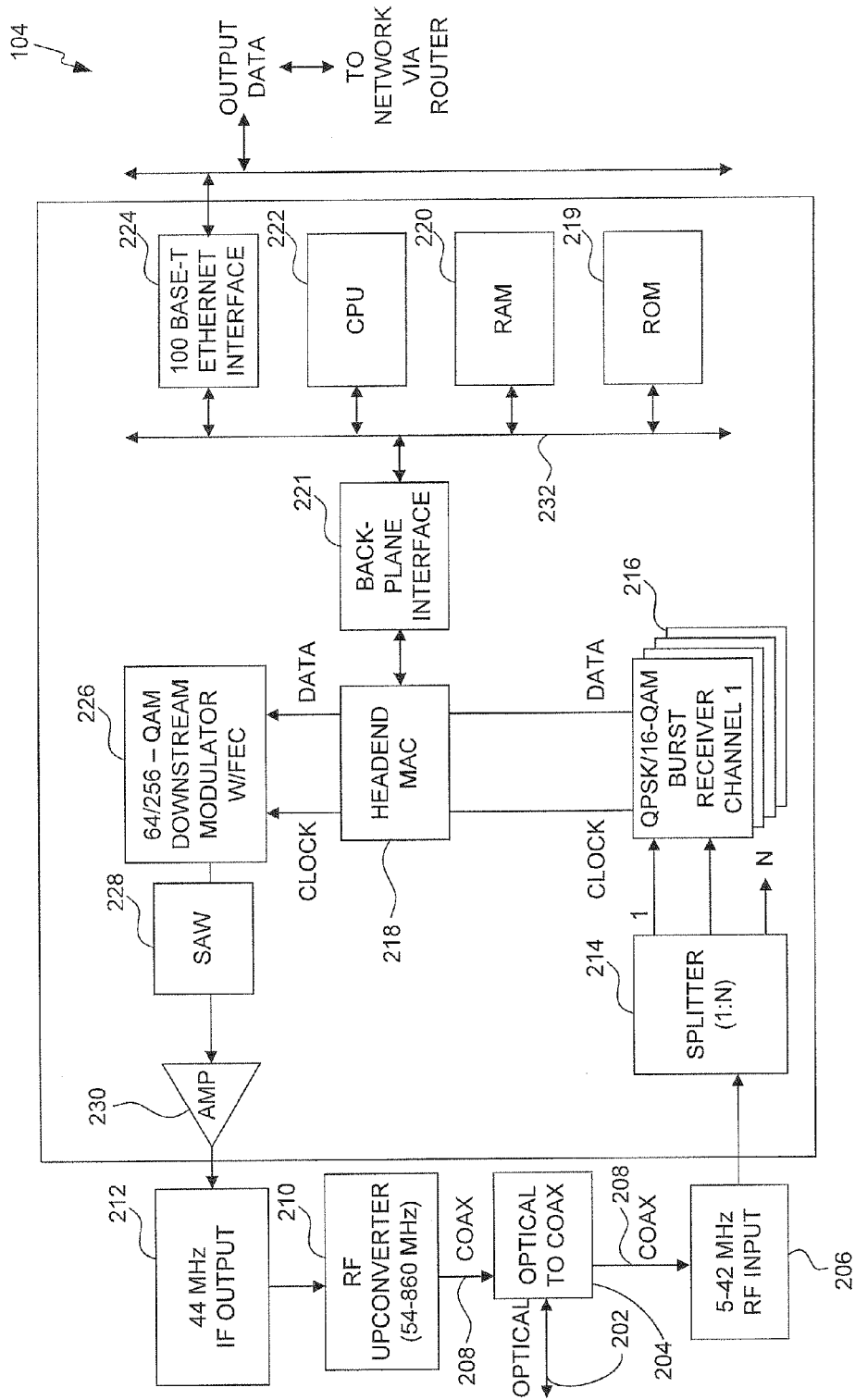
FIG. 2 is a schematic block diagram of a cable modem termination system in accordance with embodiments of the present invention.

B. Example Cable Modem System Components in Accordance with Embodiments of the Present Invention FIG. 2 depicts a schematic block diagram of an implementation of the CMTS 104 of cable modem system 100, which is presented by way of example, and is not intended to limit the present invention. The CMTS 104 is configured to receive and transmit signals to and from the HFC network 110, a portion of which is represented by the optical fiber 202 of FIG. 2. Accordingly, the CMTS 104 will be described in terms of a receiver portion and a transmitter portion.

The receiver portion includes an optical-to-coax stage 204, an RF input 206, a splitter 214, and a plurality of burst receivers 216. Reception begins with the receipt of upstream burst signals originating from one or more cable modems by the optical-to-coax stage 204 via the optical fiber 202. The optical-to-coax stage 204 routes the received burst signals to the radio frequency (RF) input 206 via coaxial cable 208. In embodiments, these upstream burst signals having spectral characteristics within the frequency range of roughly 5-42 MHz.

The received signals are provided by the RF input 206 to the splitter 214 of the CMTS 104, which separates the RF input signals into N separate channels. Each of the N separate channels is then provided to a separate burst receiver 216 which operates to demodulate the received signals on each channel in accordance with either a Quadrature Phase Shift Key (QPSK) or 16 Quadrature Amplitude Modulation (QAM) technique to recover the underlying information signals. Each burst receiver 216 also converts the underlying information signals from an analog form to digital form. This digital data is subsequently provided to the headend media access control (MAC) 218.

The headend MAC 218 operates to process the digital data in accordance with the DOCSIS specification. The headend MAC is in electrical communication with random access memory (RAM) 220 and read only memory (ROM) 218 via a backplane interface 221 and a shared communications medium 232. In embodiments, the shared communications medium 232 may comprise a computer bus or a multiple access data network.

The headend MAC 218 is also in electrical communication with the Ethernet interface 224 via both the backplane interface 220 and the shared communications medium 232. When appropriate, Ethernet packets recovered by the headend MAC 218 are transferred to the Ethernet interface 224 for delivery to the packet-switched network 112 via a router.

The transmitter portion of the CMTS 104 includes a downstream modulator 226, a surface acoustic wave (SAW) filter 228, an amplifier 230, an intermediate frequency (IF) output 212, a radio frequency (RF) upconverter 210 and the optical-to-coax stage 204. Transmission begins with the generation of a digital broadcast signal by the headend MAC 218. The digital broadcast signal may include data originally received from the packet-switched network 112 via the Ethernet interface 224. The headend MAC 218 outputs the digital broadcast signal to the downstream modulator 226 which converts it into an analog form and modulates it onto a carrier signal in accordance with either a 64-QAM or 256-QAM technique.

The modulated carrier signal output by the downstream modulator 256 is input to the SAW filter 228 which passes only spectral components of the signal that are within a desired bandwidth. The filtered signal is then output to an amplifier 230 which amplifies it and outputs it to the IF output 212. The IF output 212 routes the signal to the RF upconverter 210, which upconverts the signal. In embodiments, the upconverted signal has spectral characteristics in the frequency range of approximately 54-860 MHz. The upconverted signal is then output to the optical-to-coax stage 204 over the coaxial cable 208. The optical-to-coax stage 204 broadcasts the signal via the optical fiber 202 of the HFC network 110.

Figure 3:
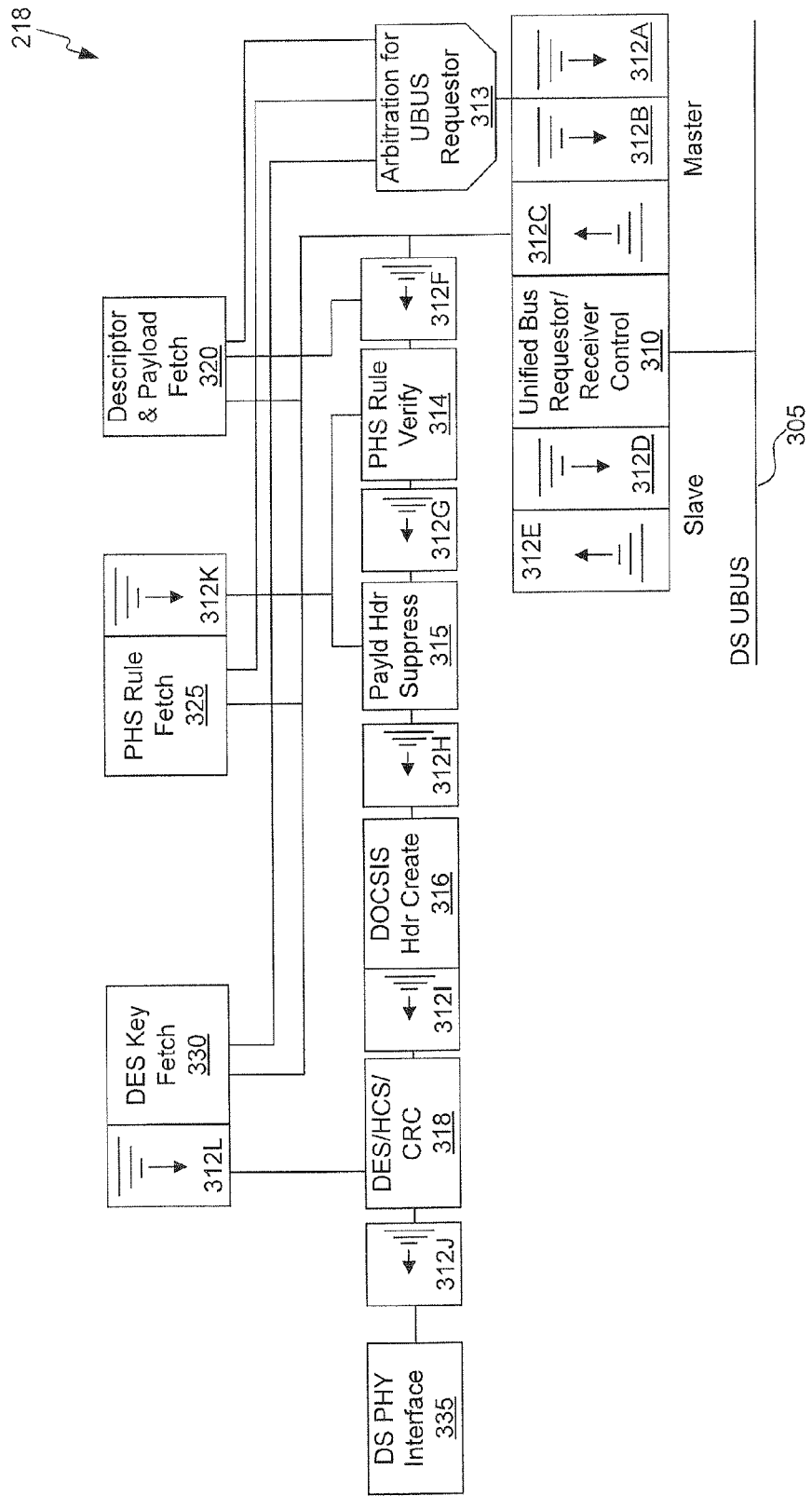
FIG. 3 is a schematic block diagram of a media access control circuit in accordance with embodiments of the present invention.

FIG. 3 provides a schematic diagram of a media access controller (MAC) 218, configured to perform payload header verification, suppression and expansion in accordance with embodiments of the present invention. The invention, however, is not limited to the description provided herein with respect to FIG. 1. Rather, it will be apparent to persons skilled in the relevant art(s) after reading the teachings provided herein that other functional hardware configurations are within the scope and spirit of the present invention. For example, the system components of the media access controller 218 are shown as separate devices, for clarity of discussion, however, in alternative embodiments one or more of the system components can be combined into a single device.

Further, the media access controller is found within the architecture of both a cable modem and a cable modem termination system. Accordingly, both a cable modem and a cable modem termination system can be made to perform payload header verification, suppression, and expansion in accordance with embodiments of the present invention.

MAC 218 is comprised of a DS UBUS 305. The DS UBUS 305 is a shared internal chip bus used for carrying data packets. The DS UBUS 305 is provided to receive data packets from an external SDRAM (not shown). The types of data packets carried may include, for example, Ethernet packets or DOCSIS packets.

Once the data packets are received by MAC 218 over DS UBUS 305, the data packets are passed internally using a plurality of FIFO registers 312. FIFO registers 312A-312L are used to provide data packets to the peripherals of MAC 218 according to a first-in, first-out process.

The DS UBUS 305 is a shared resource. Some system of allocating usage of the DS UBUS 305 among the various system components is necessary to prevent any one particular system component from being starved out. Accordingly, the MAC 218 is further provided with an arbitration for UBUS requestor 313 and a unified bus requestor/receiver controller 310.

The arbitration for UBUS requestor 313 is provided with an arbitration scheme for allocating bus usage among the competing system components. An exemplary arbitration scheme assigns priority levels to each of the system components and gives them access to the bus based on the respective priority levels. A further example of an arbitration scheme is a "round-robin" scheme. In this scheme, all of the requestors are given the same priority level and alternate in sequence for access to the bus.

Once a request for usage of the DS UBUS 305 has been arbitrated, the unified bus requestor/receiver controller 310 issues the request to access the external memory.

The MAC 218 is further comprised of a payload header suppression verify circuit 314 and a payload header suppress circuit 315. Payload header suppression verify circuit 314 is used to perform verification of a data packet payload header based upon the payload header suppression rule. Verification is used to determine if payload header suppression should be performed. The decision of whether verification of the packet header will be performed is controlled by the value of a verification bit in the PHS rule. Accordingly, if the bit is enabled, then PHS verify circuit 314 is used to verify the payload header. Payload header suppression verify circuit 314 will be further described below with respect to FIG. 4.

In accordance with an embodiment of the present invention, payload header suppress circuit 315 receives successfully verified packet payload headers from the payload header suppression verify circuit 314 and suppresses the payload headers using available payload header suppression rules. In an embodiment, payload header suppress circuit 315 receives suppressed payload headers and in response expands the headers using available payload header suppression rules. Payload header suppress circuit 315 will be further described below with respect to FIG. 8.

Descriptor and payload fetch circuit 320 is a controller used to obtain the data packet and packet header descriptor from the external SDRAM (not shown). This data is subsequently provided to PHS rule verify circuit 314 for use in verifying the payload header.

The descriptor and payload fetch circuit 320 fetches the payload header descriptor and payload data from its FIFO 312F and stores the values from the descriptor words into local registers. The descriptor words, prepended to the start of every packet, contain control information for enabling CRC generation, PHS processing, baseline privacy encryption, etc.

Payload header suppression rule fetch circuit 325 is a controller used to locally store a plurality of payload header suppression rules. The payload header suppression rules provide instructions regarding the suppression and expansion of the payload headers to the PHS verify circuit 314 and payload header suppress circuit 315.

Once each data packet has been processed by the PHS verify circuit 314 and the payload header suppress circuit 315, the data packet is passed to DOCSIS header creator circuit 316.

The primary function of DOCSIS header creator 316 is to generate a DOCSIS header in compliance with the DOCSIS specification. The DOCSIS specification is available from Cable Television Laboratories, Inc., Louisville, Colo., and is incorporated herein by reference in its entirety.

The MAC 218 further includes an encryption key fetch 330. The encryption key fetch 330 is used to provide an encryption key for use in an encryption algorithm to encrypt and un-encrypt the data packet after the DOCSIS header has been appended to the data packet. In an embodiment, the Data Encryption Standard (DES) algorithm is used.

The MAC 218 is also provided with an encryption and cyclic redundancy control circuit 318. The encryption and cyclic redundancy control circuit 318 has two primary functions. The first function is used to encrypt the data packet using the encryption key provided by the encryption key fetch 330. The second function is to calculate a header check sequence (HCS) and a cyclic redundancy code (CRC). The HCS is a number derived from the DOCSIS header and is used to ensure its integrity. The CRC is a number derived from the length of the data packet and is used to detect corruption. By recalculating the CRC and comparing it to the value originally transmitted, the receiver can detect some types of transmission errors.

Once the DOCSIS header has been added to the data packet, the data packet is passed to down stream physical interface (DS PHY) 335. DS PHY Interface 335 provides an interface to a physical layer chip (not shown) which is responsible for receiving data packets and subsequently transmitting the data packets downstream over a coaxial cable.

Figure 4:
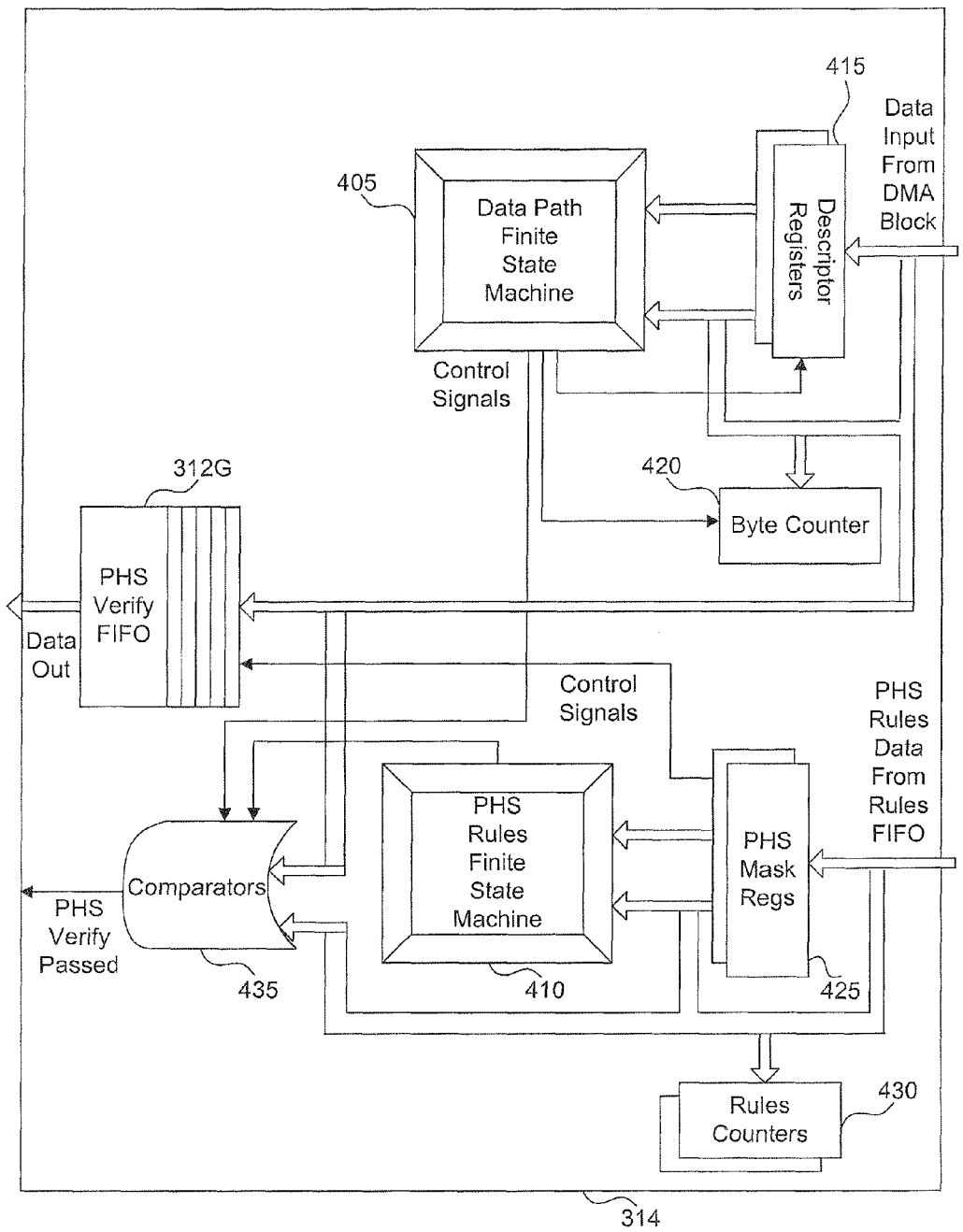
FIG. 4 is a schematic block diagram of a payload rule verify circuit in accordance with embodiments of the present invention.

FIG. 4 provides a detailed block diagram of the PHS verify circuit 314. In an embodiment, the PHS verify circuit 314 is comprised of a data path finite state machine 405 and a PHS rules finite state machine 410. The data path finite state machine 405 and the PHS rules finite state machine 410 are responsible for creating all the necessary control signals that synchronize the flow of the packet data and the PHS rules data throughout the MAC 218.

As packet data enters into the PHS verify circuit 314, it is stored in one or more descriptor registers 415. Packet data can include for example, the packet descriptor, payload header and payload. As the packet data is read out of the descriptor registers 415, byte counter 420 is incremented. By referencing the value of the byte counter 420, the data path finite state machine 405 is able to identify specific portions of the data packet such as the start of the packet, packet header, and payload portions. Thus, if the data path finite state machine 405 determines that the payload header begins at the $9^{th}$ byte of the data packet then when the byte counter 420 reaches 9, the data path finite state machine 405 is able to identify the current bytes being read out of the descriptor registers 415 as containing data from the payload header. In this way, the data path finite state machine 405 is able to generate the appropriate control signals to direct packet data from the descriptor registers 415 to the respective system components.

The PHS verify circuit 314 is further provided with one or more PHS mask registers 425. The PHS rules and masks are fetched from the external memory by a DMA block (not shown) and stored inside the chip in a FIFO. Such as for example, the PHS rules FIFO 312K from FIG. 3.

As data pertaining to the PHS rules enters the PHS verify circuit 314, the bytes of data corresponding to the PHS mask are stored in the PHS mask registers 425. The PHS mask is a map to the bytes in the payload header that are candidates for suppression. Further details of the PHS mask are provided below with respect to FIG. 6.

One or more rules counters 430 are used to keep track of the mask bytes and the rules bytes as they are retrieved. In this way the PHS rules finite state machine 410 is able to identify what portion of the PHS rule is currently being read out of the PHS mask registers 425.

In this case, the PHS rule is compared to the payload header data using comparator 435. A verify pass or fail bit is enabled to indicate whether payload header suppression will be performed or not. Once processing by the PHS verify circuit 314 has been completed, the packet data along with the necessary descriptor information and the mask bits are stored in the PHS verify FIFO 312G for further processing.

Figure 5:
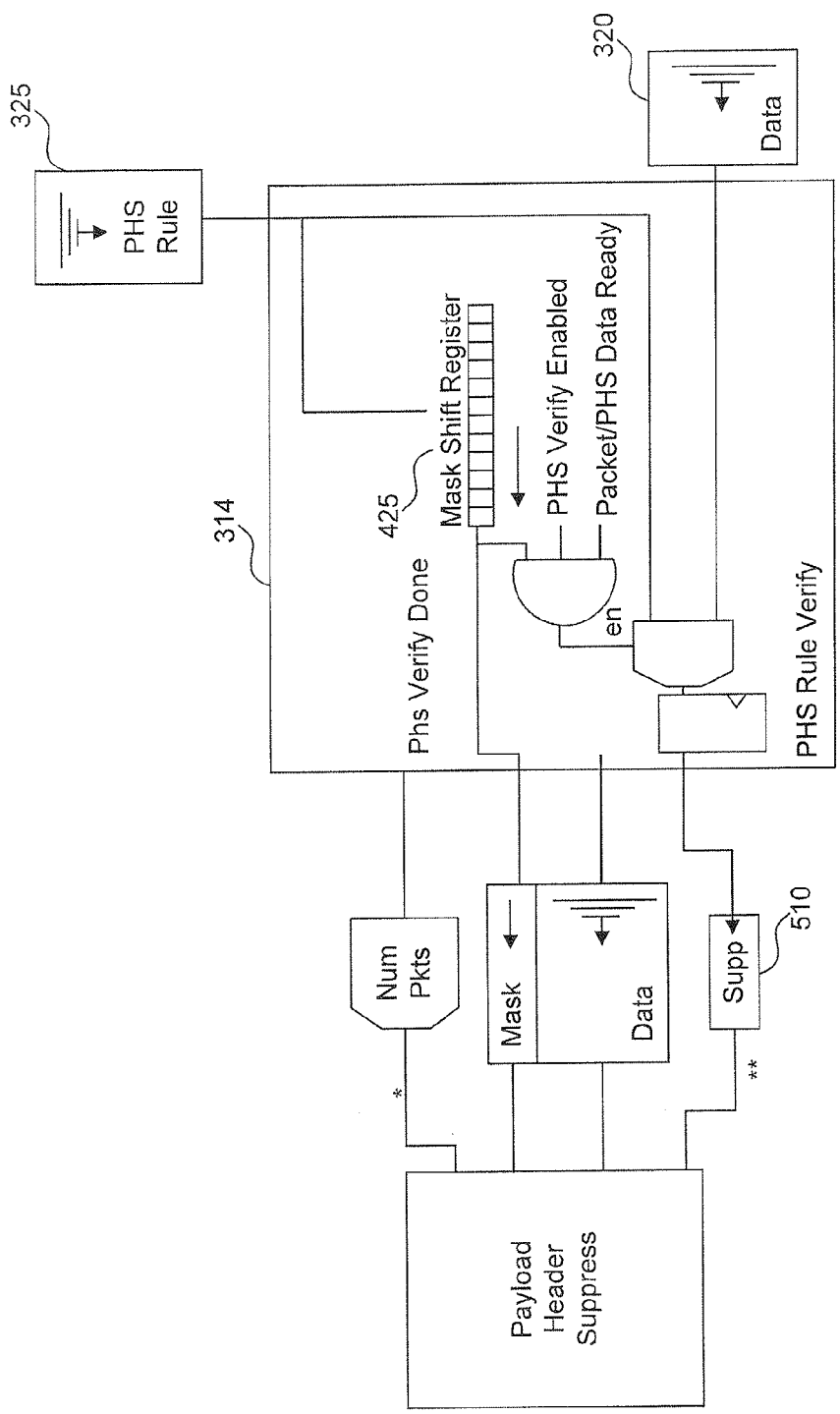
FIG. 5 is a further detailed schematic block diagram of a payload rule verify circuit in accordance with embodiments of the present invention.

Referring to FIG. 5, the PHS verify circuit 314 is shown in communications with the two controllers, PHS rule fetch 325 and descriptor and payload fetch 320. The PHS rules fetch 325, upon detecting the presence of stored rules in the PHS rule FIFO 312K, fetches the rules and stores the PHS size, verify bit, and PHS mask into the one or more PHS mask registers 425.

The PHS mask shift register 425 is loaded with every new PHS rule, and shifts every time a byte from the correct portion of the data packet payload passes through the data pipeline. The PHS size is used as a measure of the number of bytes in the PHS field and also indicates the number of "ones" in the mask bits.

Once the payload data portion of the packet is in the pipeline, the two state machines 325 and 320 are configured to synchronize and, in conjunction with the PHS mask register 425, perform the PHS verification. The PHS Rule Verify 314 operates on raw ethernet or complete DOCSIS frames utilizing PHS rules formatted as defined by the table shown in FIG. 6 and described below. Every time a bit in the PHS mask is asserted, the bytes from the PHS field (PHSF) are compared to the payload header data bytes and a fail/pass flag is generated. If at any point, the bytes do not match, a fail flag is set. When the verification is complete, a verification result flag is stored into a separate FIFO such as, for example, Supp 510. If at any point in the comparison process a fail flag is asserted, then the verification result flag will be set to fail. If each asserted bit in the mask is the same as the bytes found in the PHS field then the verification result flag will be set to pass. In an embodiment, the verification result flag is represented by a binary value of zero or one. The verification result flag is used by the PHS header suppress 315 to determine whether to suppress the data bytes.

The packet descriptor, packet header, and payload data along with the mask bits are also passed into a FIFO 312G as the output of PHS Rule Verify 314. The Payload header suppress circuit 315 uses all this information to perform the suppression further down the pipe by simply suppressing a byte string if both the "PHS verify passed" and mask bits are asserted.

Referring again to FIG. 4, PHS verify circuit 314 further includes self-checking circuits to keep the software from inadvertently causing the PHS suppress circuit 315 to suppress using incorrectly formatted PHS rules. Comparator circuits are installed to compare the values programmed in the rules. Logic is installed to count the number of ones in the mask bits and compare the result to the PHS size. If the values do not match, PHS will be disabled for the given packet and the host will be notified of the error. Similar error detectors are in place for checking when packets are smaller than the PHS Rule size and when the packet ends when there are still some "ones" left in the PHS Mask field.

Referring to FIG. 6, the payload header suppression rule fields that are of interest to the PHS verify circuit 314 are the Rule Length, PHS verify bit (V), PHS Mask, and PHS Rule Verify Bytes.

The PHS Index (PHSI) and Service Flow ID Index are values used further down in the data path and are thus simply forwarded along with packet descriptor information.

The PHS Rule length indicates the number of bytes that may be suppressed in the payload header using a particular rule. The field also implies the number of "ones" in the PHS Mask and the total length of the PHS Rule block as it is stored in the PHS Rule FIFO 312K (total PHS Rule block length in bytes=9+rule length, if V asserted).

The PHS verify bit indicates that verify bytes exist in the rule, and that suppressible bytes in the packet payload must be verified against bytes in the rule before PHS is allowed.

The PHS Mask is a map to the bytes in the header that are candidates for suppression. Finally, the PHS Rule Verify bytes are those bytes that must be compared to the payload header data during the verify phase of the PHS processing.

Figure 7:
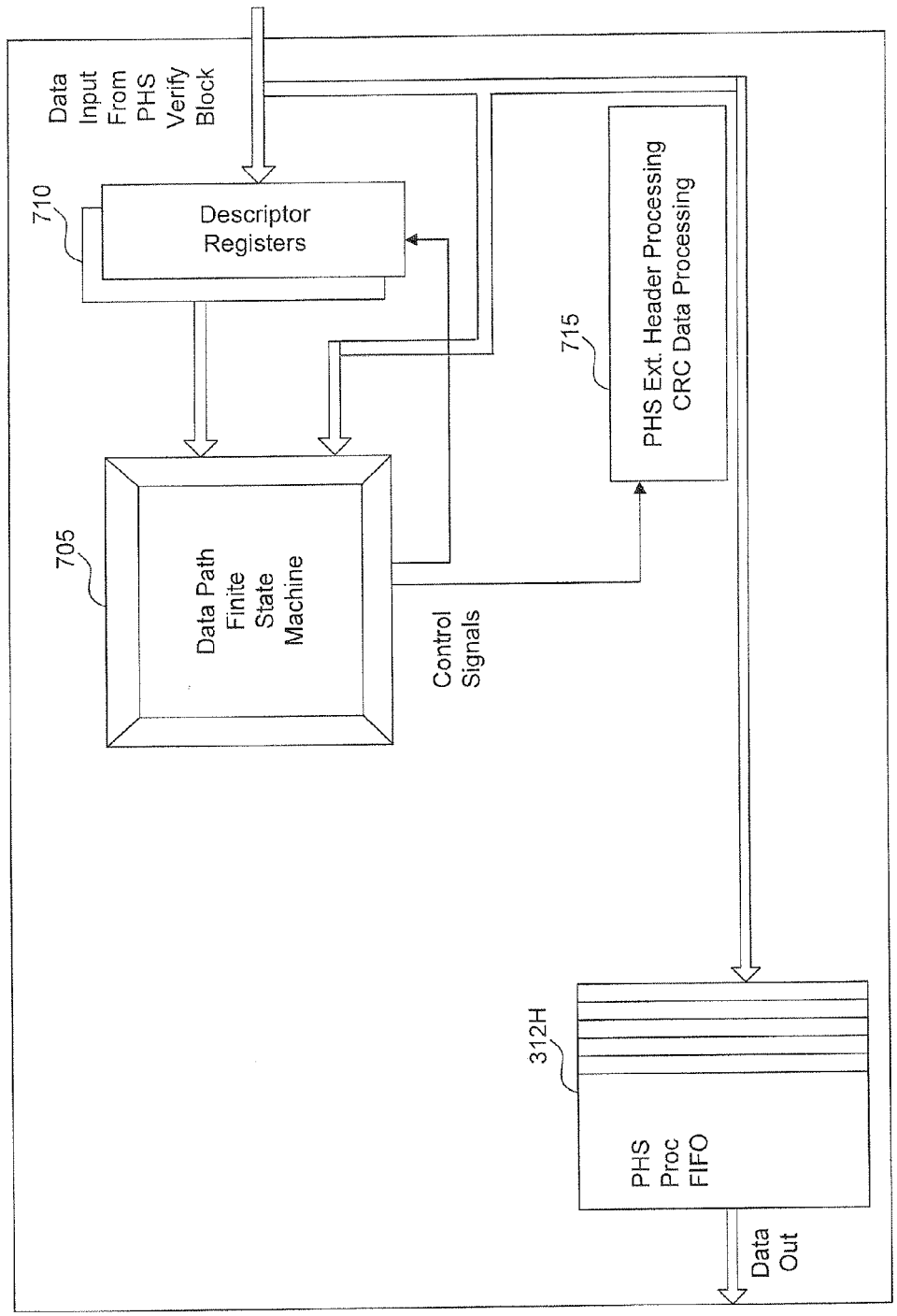
FIG. 7 is a schematic block diagram of a payload header suppress circuit in accordance with embodiments of the present invention.

FIG. 7 provides a detailed block diagram of the Payload Header Suppress circuit 315. The verification result flag, the packet data, descriptor information, and PHS masks are fetched from the PHS verify FIFO 312G. The PHS circuit 315 processes this information with the use of the data path finite state machine 705. The packet descriptor information is stored in one or more descriptor registers 710. Using logic embedded within PHS header/CRC data processor 715, PHS circuit 315 is further able to calculate a new extended PHS header and byte count for the suppressed data packet. PHS circuit 315 is also able to determine whether CRC calculations need to be performed and appended or replaced with the existing packet data CRC bytes. The packet data along with the necessary descriptor information are stored in the PHS proc FIFO 312H for further processing.

An exemplary method of performing payload header verification and suppression in hardware will now be described with respect to flowchart shown in FIG. 8.

Figure 8:
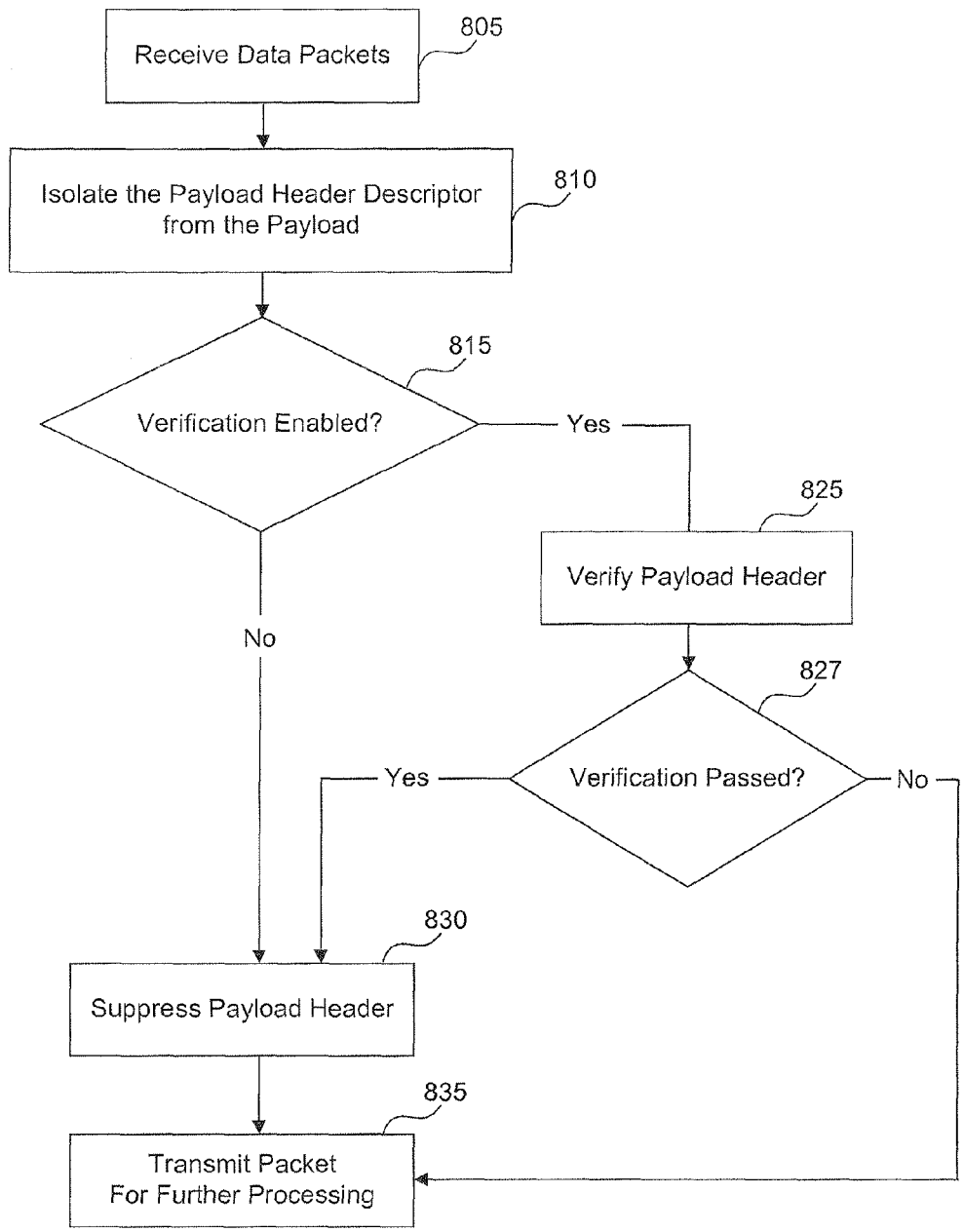
FIG. 8 is a flowchart diagram illustrating a method for performing payload header suppression in accordance with embodiments of the present invention.

The invention, however, is not limited to the description provided herein with respect to flowchart depicted in FIG. 8. Rather, it will be apparent to persons skilled in the relevant art(s) after reading the teachings provided herein that other functional flows are within the scope and spirit of the present invention. The flowcharts will be described with continued reference to the example MAC 218 of FIG. 2.

Exemplary Payload Header Suppression Method

In FIG. 8, step 805, MAC 218 receives over DS UBUS 305, a plurality of data packets.

Next, in step 810, descriptor & payload fetch circuit 320 isolates the header descriptor and payload portion from each of the plurality of data packets. In addition, PHS rule fetch 325 retrieves the PHS rule corresponding to the type of service flow being used. The service flow indicates where the data packet is being directed and the quality of service to be provided. The PHS rule contains the number of suppressed bytes, a mask that indicates which bytes are to be suppressed and the string of the suppressed bytes.

Next, in step 815, MAC 218 determines if verification of the packet payload header is enabled. Verification is used to confirm that the packet length and packet payload header byte values are equal to the expected values as defined in the PHS rule. If verification is not enabled, then control passes to step 830. If verification is enabled, then control passes to step 825.

In step 825, verification of the packet payload header is performed. In the disclosed embodiment, the verification is performed in accordance with the protocol set forth in DOCSIS (Data Over Cable System Interface Specification) published by CableLabs.

In general, the PHSF bytes in the data packet payload header are compared with the bytes that are to be suppressed as indicated by the PHSM.

More specifically, to compare the PHSF and PHSM, the PHSM is first loaded into the mask shift register 505 (FIG. 5). As each byte of the payload header is passed to the PHS verify circuit 314, the mask shift register 505 advances one bit in the PHSM. When a value of one is encountered in the PHSM, the packet payload header byte value and the PHS verify byte value from the PHSM are compared. If the two are equal, then the verification pass flag in asserted. The verification process is continued until each byte within the packet payload header has been verified.

In step 827, a determination of whether the data packet payload header passed the verification process is made. More specifically, all of the packet payload header bytes must compare equally to the PHSM in order to pass verification. As shown in step 827, failure to pass the verification process would result in the packet payload header bypassing the suppression step 830. Consequently, the payload header would be sent in an unsuppressed format. If all of the packet header bytes are determined to be equal to the values of the PHSM then the PHS rule verify 314 activates a suppress enable bit to indicate to payload header suppress 315 that it should suppress the packet header.

In step 830, payload header suppress 315 suppresses the packet payload header according to the PHSM. A payload header suppression index (PHSI) will be added to the packet payload header to indicate that the packet header payload has been suppressed.

Finally, in step 835, the data packet is provided to DS PHY interface 335 so it can be transmitted to a cable modem. If verification was not enabled or if the packet payload header failed the verification process, then the data packet would be forwarded in an unsuppressed format. If, however, verification was enabled and successfully passed, then the data packet would be forwarded with its packet payload header suppressed.

When the packet is received the receiver is able to determine that the packet payload header has been suppressed based on the attached PHSI. Using the PHSI, the receiver will look up the PHS, PHSM, and PHSS for use in reassembling the packet payload header. After reassembling the packet payload header, the receiver will proceed with normal packet processing.

As previously mentioned, the present invention can be implemented in both a cable modem and a cable modem termination system. Accordingly, when the packets originate with the cable modem, the present invention is implemented such that verification and suppression occur in the transmitter or upstream portion of the cable modem. On the receiving end, the present invention would be implemented such that packet header expansion is performed in the receiver portion of the cable modem termination system. Conversely, when the packets originate with the cable modem termination system, the present invention is implemented such that verification and suppression occur in the transmitter or downstream portion of the cable modem termination system. On the receiving end, the present invention would be implemented such that packet header expansion is performed in the receiver portion of the cable modem.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for performing payload header suppression in a communications system, the method comprising:
    comparing a first header value, from among a plurality of header values, of a data packet to a first mask value from among a plurality of mask values;
    setting a first verification indication from among a plurality of verification indications when the first header value is equal to the first mask value;
    advancing the first mask value to a second mask value from among the plurality of mask values and the first header value to a second header value, from among the plurality of header values, of the data packet;
    comparing the second header value to the second mask value;
    setting a second verification indication from among the plurality of verification indications when the second header value is equal to the second mask value; and
    suppressing the plurality of header values according to the first and second mask values when the first and the second verification indications are set.

2. The method of claim 1, further comprising:
    retrieving a payload header suppression rule including the plurality of mask values.

3. The method of claim 2, wherein the retrieving comprises:
    retrieving the payload header suppression rule corresponding to a service flow.

4. The method of claim 1, further comprising:
    verifying the plurality of header values are equal to expected values as defined in a payload header suppression rule.

5. The method of claim 1, further comprising:
    advancing the plurality of mask values until the first mask value corresponds to a first logical value, and wherein the comparing the first header value comprises:
    comparing the first header value to the first mask value when the first logical value is encountered.

6. The method of claim 5, wherein the first logical value corresponds to a logical one.

7. The method of claim 1, further comprising:
    activating a suppress enable bit to indicate that the plurality of header values are to be suppressed when the first and the second verification indications are set.

8. The method of claim 1, further comprising:
    appending a payload header suppression index to a payload header having the plurality of header values indicating that the payload header has been suppressed.

9. The method of claim 1, further comprising:
    providing the data packet having the plurality of header values for transmission.

10. The method of claim 1, further comprising:
isolating a header having the plurality of header values and a payload from the data packet.

11. An apparatus for performing payload header suppression in a communications system, the apparatus comprising:
a payload header suppression verify circuit configured to:
compare a first header value, from among a plurality of header values, of a data packet to a first mask value from among a plurality of mask values,
set a first verification indication from among a plurality of verification indications when the first header value is equal to the first mask value,
advance the first mask value to a second mask value from among the plurality of mask values and the first header value to a second header value, from among the plurality of header values, of the data packet,
compare the second header value to the second mask value,
set a second verification indication from among the plurality of verification indications when the second header value is equal to the second mask value, and
a payload header suppression circuit configured to suppress the plurality of header values according to the plurality of mask values when the first and the second corresponding verification indications are set.

12. The apparatus of claim 11, wherein the payload header suppression verify circuit comprises:
a mask register configured to store the first mask value;
a descriptor register configured to store the first header value; and
a comparator configured to compare the first header value to the first mask value and to set the first verification indication when the first header value is equal to the first mask value.

13. The apparatus of claim 12, wherein the payload header suppression verify circuit further comprises:
a state machine configured to cause the mask register and the descriptor register to advance until the first mask value corresponds to a first logical value.

14. The apparatus of claim 13, wherein the first logical value corresponds to a logical one.

15. The apparatus of claim 11, further comprising:
a payload header suppression rule fetch circuit configured to retrieve a payload header suppression rule including the plurality of mask values.

16. The apparatus of claim 15, wherein the payload header suppression rule fetch circuit is further configured to retrieve the payload header suppression rule corresponding to a service flow.

17. The apparatus of claim 11, wherein the payload header suppression verify circuit is further configured to:
verify the plurality of header values are equal to expected values as defined in a payload header suppression rule.

18. The apparatus of claim 11, wherein the payload header suppression verify circuit is further configured to:
activate a suppress enable bit to indicate that the plurality of header values are to be suppressed when the first and the second verification indications are set.

19. The apparatus of claim 11, wherein the payload header suppression verify circuit is further configured to append a payload header suppression index to a payload header having the plurality of header values indicating that the payload header has been suppressed.

20. The apparatus of claim 11, further comprising:
a description and payload fetch circuit configured to isolate a header having the plurality of header values and a payload from the data packet.

* * * * *

UNITED STATES PATENT AND TRADEMARK OFFICE
CERTIFICATE OF CORRECTION

PATENT NO.        : 8,971,326 B2  
APPLICATION NO.   : 12/939508  
DATED             : March 3, 2015  
INVENTOR(S)       : Lansing et al.

Page 1 of 1

It is certified that error appears in the above-identified patent and that said Letters Patent is hereby corrected as shown below:

Title Page, Abstract, Item (57), please replace "PHS vile" with --PHS rule--.

Signed and Sealed this  
Second Day of June, 2015

Michelle K. Lee  
*Director of the United States Patent and Trademark Office*